United States Patent Office 3,510,536
Patented May 5, 1970

1

3,510,536
TELOMERIZATION OF ISOPRENE
John F. Brennan, Des Plaines, Ill., assignor to Universal Oil Products Company, Des Plains, Ill., a corporation of Delaware
No Drawing. Continuation-in-part of application Ser. No. 675,051, Oct. 13, 1967. This application Mar. 25, 1969, Ser. No. 810,333
Int. Cl. C07c 3/18
U.S. Cl. 260—680                                7 Claims

ABSTRACT OF THE DISCLOSURE

The telomerization of isoprene is accomplished by treating isoprene with hydrogen in the presence of certain catalytical compositions of matter, and particularly a catalyst comprising a titanium halide and a halide of a metal of Group VIII of the Periodic Table.

---

This application is a continuation-in-part of my copending application, Ser. No. 675,051, filed Oct. 13, 1967, now abandoned.

This invention relates to a process for the telomerization of olefinic hydrocarbons, and particularly to the telomerization of isoprene. Telomerization is a form of polymerization in which the polymerizable compounds such as olefinic hydrocarbons are condensed in the presence of certain catalytic compositions of matter. As contrasted to polymerization reactions which usually result in the preparation of relatively high molecular weight compounds, said molecular weight being from about 500 up to many thousands, telomerization of olefinic hydrocarbons will result in the preparation of relatively low molecular weight polymers. These polymers will include the dimers, trimers, tetramers, etc. of the starting materials. Therefore, the term "telomerization" as used in the present specification and appended claims will refer to polymers which are dimers, trimers, or tetramers of the starting material.

Telomers of unsaturated hydrocarbons, and particularly olefinic hydrocarbons, have been found to possess many new and useful properties. A specific example of this is the telomers of isoprene which is prepared in a manner hereinafter set forth in greater detail. These telomers of isoprene possess a certain fragrance or aroma, having a relatively strong odor somewhat akin to terpentine which is a cross between a gum elemi and an olibanum odor. This intense odor renders the telomers useful for industrial applications such as scouring powders, sweeping compounds, etc., whereby a particular objectionable odor which may be present due to particular compounds which are used for these products is masked, thereby lending the finished product a unique odor. Another way of describing this odor is that it is medicinal or hospital-like in nature. This property is of particular importance inasmuch as isoprene will constitute a relatively inexpensive starting material for the preparation of these telomers which may then be incorporated into other formulations where the particular odor or aroma is a desired characteristic. This type of odor is in contrast to other compounds which possess a delicate aroma or fragrance, whereby these latter compounds may be used in formulations involved in perfumes, colognes, certain soaps, talcs, bath powders, after shave lotions, etc.

It is therefore an object of this invention to provide a process for preparing new and useful compounds.

A further object of this invention is to provide a process for the telomerization of olefinic hydrocarbons and particularly isoprene.

In one aspect an embodiment of this invention is found

2 in a process for the telomerization of isoprene which comprises treating isoprene with hydrogen in the presence of a catalyst comprising a titanium halide and a halide of a metal of Group VIII of the Periodic Table at telomerization conditions, and recovering the resultant telomer.

A specific embodiment of this invention is found in the process for the telomerization of isoprene which comprises treating said isoprene with hydrogen in the presence of a catalyst comprising titanium trichloride and ruthenium chloride at a temperature in the range of from about ambient to about 150° C. and a hydrogen pressure of from about 1 to about 50 atmospheres, and recovering the resultant telomers.

Other objects and embodiments will be found in the following further detailed description of the present invention.

As hereinbefore set forth, I have now discovered that when olefinic hydrocarbons are treated with hydrogen in the presence of certain catalytical compositions of matter of the type hereinafter set forth in greater detail, the resulting telomers will possess unique characteristics, namely, certain aromas or odors which will make them useful articles of commerce. The catalytical compositions of matter which are utilized to prepare the desired telomers will comprise a catalyst containing a titanium halide and a halide of a metal of Group VIII of the Periodic Table. Specific examples of these metal halides include iron chloride, nickel chloride, cobalt chloride, platinum chloride, palladium chloride, iridium chloride, osmium chloride, ruthenium chloride, rhodium chloride, the corresponding bromides, etc. A particularly preferred metal halide comprises ruthenium chloride and specifically when the ruthenium component of the catalyst is present in a valence state of +2. The preferred catalyst which is used in the process of this invention may be prepared by reducing an ammonium-ruthenium chloride complex such as $(NH_4)_2RuCl_6$ with a titanium halide, preferably titanium trichloride, using an excess of titanium trichloride in a reactor which has been purged with nitrogen, the characteristic deep blue color of the ruthenium in a valence state of 2 appearing when the reagents are mixed. Inasmuch as the ruthenium chloride complex, in which the ruthenium is present in a valence state of 2, is easily oxidized to a compound in which the ruthenium is present in a valence state of 3, it is necessary to effect the process of this invention in an oxygen-free atmosphere. Therefore, any dissolved air must be removed from the catalyst and the feed stock using nitrogen as a purge medium. In addition, in some instances, it may also be necessary to remove organic peroxides which may be present utilizing a ferrous sulfate wash.

The treatment of the particular olefinic hydrocarbon, namely, isoprene (2-methyl-1,3-butadiene) will be effected at telomerization conditions, said conditions including a temperature in the range of from about ambient (25° C.) up to about 150° C. or more and at a hydrogen pressure in the range of from about 1 to about 50 atmospheres.

The process of this invention may be effected in any suitable manner and may comprise either a batch or continuous type operation. For example, when a batch type operation is used, a quantity of the isoprene is placed in a reaction apparatus such as, for example, a rotating or mixing autoclave which contains, in addition, the catalytic compositions of matter containing a titanium halide and a halide of a metal of Group VIII of the Periodic Table such as a ruthenium halide in which the ruthenium component is present in a valence state of +2 and which has been prepared according to the method hereinbefore set forth in greater detail. As hereinabove set forth, care must be taken in order that the isoprene feed stock is free of any dissolved air, organic peroxides, and any other compounds containing oxygen. Therefore, the feed stock, before being placed in the reaction apparatus, is dried and subjected to a nitrogen purge in order to remove any contaminating influences which may be present. In addition, the catalyst is also treated in a similar manner by undergoing a nitrogen purge. The vessel is sealed and heated to the desired operating temperature which is in a range previously discussed, following which hydrogen is pressed in until the desired operating pressure is reached. The telomerization is allowed to proceed for a predetermined period of time which may range from 1 up to about 10 hours or more in duration. At the end of this time the reactor, if superatmospheric temperatures have been used, is allowed to cool to room temperature and the excess pressure is vented. The reaction mixture is recovered and separated from the catalyst, following which the reaction mixture may then be subjected to fractional distillation whereby the desired telomers are separated from any unreacted starting material. In addition, if so desired, it is also contemplated within the scope of this invention that the reaction may be effected in the presence of substantially inert solvents in order to facilitate the mixing of the reactants. Examples of these inert organic solvents will include methyl alcohol, ethyl alcohol, propyl alcohol, n-pentane, n-hexane, n-heptane, benzene, toluene, o-xylene, m-xylene, p-xylene, etc.

It is also contemplated within the scope of this invention that the process may be effected in a continuous manner of operation. For example, when this type of operation is used, the feed stock comprising isoprene is continuously charged to a reaction zone which is maintained at the proper operating conditions of temperature and pressure. The feed stock is treated in a manner similar to that hereinbefore set forth before being charged to the reactor, that is, by being dried and purged with nitrogen in order to remove any contaminates which may have a deleterious effect upon the catalyst. A catalyst, such as one which contains a titanium halide and a ruthenium chloride complex in which the ruthenium is in a valence state of +2 is also added to the reaction zone after undergoing a nitrogen purge. The aforementioned desired pressure is provided for by the introduction of hydrogen to the reaction vessel in an amount sufficient to maintain the desired operating pressure. However, it is also contemplated within the scope of this invention, that the hydrogen introduced may account for only a portion of the operating pressure, the remainder of said pressure being provided for by the use of an inert gas such as nitrogen to augment the hydrogen charge and thus provide the desired operating pressure. After completion of the desired residence time, the reactor effluent is continuously withdrawn from the reaction zone and subjected to a separation process by any manner known in the art whereby the desired telomers are separated from unreacted starting material and catalyst, the latter two being recycled to the reaction zone to form a portion of the feed stock.

The following examples are given to illustrate the process of the present invention which, however, are not intended to limit the generally broad scope of the present invention in strict accordance therewith.

EXAMPLE I

A ruthenium chloride catalyst in which the ruthenium component was present in a valence state of +2 was prepared by treating ammonium ruthenium chloride with titanium trichloride employing an excess of titanium trichloride in a reactor which has been purged with nitrogen. The characteristic deep blue color or ruthenium in a +2 valence state appeared when the reagents were mixed.

A hydrocarbon charge stock comprising 2-methyl-1,3-butadiene (isoprene) was treated prior to introduction into the reaction vessel, which comprised a hydrogenation bomb, by a nitrogen purge whereby dissolved air was removed from the hydrocarbon. The vessel was sealed and hydrogen was pressed in until an initial pressure of 5 atmospheres was reached. The autoclave was heated to a temperature of about 80° C. and maintained thereat for a period of about 24 hours. At the end of this time, the excess pressure was vented and the autoclave was allowed to return to room temperature and the reaction product was recovered. The product comprised a telomer of isoprene which was a dark brown liquid possessing a strong terpentine or medicinal-like odor.

EXAMPLE II

A hydrocarbon charge stock comprising isoprene was treated by a nitrogen purge to remove dissolved air and thereafter charged to a hydrogenation bomb which contained a catalyst consisting of titanium trichloride alone. The isoprene feed stock was treated in a manner similar to that set forth in Example I above. At the end of the residence time, the excess pressure was vented and the reaction product was recovered. The telomerization products which were recovered had a very disagreeable odor unlike the products obtained when utilizing a catalyst system comprising titanium trichloride and ruthenium chloride.

EXAMPLE III

To further illustrate the necessity of effecting the telomerization in the presence of a 2-component catalyst system, another experiment was performed in which isoprene was treated in a manner similar to that set forth in Example I above, the only difference being that the catalyst which was used to effect the telomerization was an aqueous ammonium ruthenium chloride. The product which was recovered after the treatment consisted of a very small amount of telomers which did not posses an odor comparable to the odor which was present in the telomers which were produced by utilizing the co-catalyst system set forth in Example I.

EXAMPLE IV

In this example a mixture comprising 0.5 g. of rhodium chloride, 25 cc. of an aqueous 20% titanium trichloride, and 25 cc. of water was placed in a hydrogenation bomb along with 15 cc. of isoprene which had been pretreated by a nitrogen purge to remove dissolved air prior to introduction into the bomb. The vessel was sealed and hydrogen pressed in until an initial pressure of 5 atmospheres was reached. The bomb was rotated for a period of 16 hours while maintaining the temperature at 50° C. At the end of this time, the bomb was allowed to cool to room temperature, the excess pressure was vented, and the reaction product was recovered. The product comprised a telomer of isoprene which possessed a strong medicinal-like odor.

EXAMPLE V

A mixture of 0.5 g. of ferric chloride hydrate, 25 cc. of an aqueous 20% solution of titanium trichloride, and 25 cc. of water was placed in a hydrogenation bomb along with 15 cc. of isoprene which had been pretreated prior to introduction into said bomb by a nitrogen purge whereby dissolved air was removed from the hydrocarbon. The bomb was sealed, hydrogen was pressed in until an initial pressure of 5 atmospheres was reached, and the vessel was heated to a temperature of 50° C. The bomb was rotated for a period of 16 hours at this temperature and thereafter allowed to cool to room temperature. The excess pressure was vented, and the reaction product was recovered. The product, which comprised a telomer of isoprene, had a medicinal-like odor which was similar in nature to that of the telomers which were obtained when using a catalyst comprising a ruthenium chloride-titanium chloride and a rhodium chloride-titanium chloride system.

I claim as my invention:

1. A process for the telomerization of isoprene which comprises treating isoprene with hydrogen at a temperature of from about ambient to about 150° C. and a hydrogen pressure of from about 1 to about 50 atmospheres in the presence of a catalyst consisting essentially of a titanium halide and halide of a metal selected from the group consisting of ruthenium, rhodium and iron.

2. The process as set forth in claim 1 in which said telomerization of isoprene is effected in an oxygen-free atmosphere.

3. The process as set forth in claim 1 in which said titanium halide is titanium trichloride.

4. The process as set forth in claim 1 in which said metal halide is ruthenium chloride.

5. The process as set forth in claim 4 in which the ruthenium component of the catalyst is in a valence state of +2.

6. The process as set forth in claim 1 in which said metal halide is rhodium chloride.

7. The process as set forth in claim 1 in which said metal halide is iron chloride.

References Cited

UNITED STATES PATENTS

| | | | |
|---|---|---|---|
| 3,008,945 | 11/1961 | Saltman | 260—94.3 |
| 3,051,690 | 8/1962 | Vandenberg | 260—94.3 X |
| 3,238,146 | 3/1966 | Hewett et al. | 252—441 |

PAUL M. COUGHLAN, JR., Primary Examiner

U.S. Cl. X.R.

252—88, 441